UNITED STATES PATENT OFFICE.

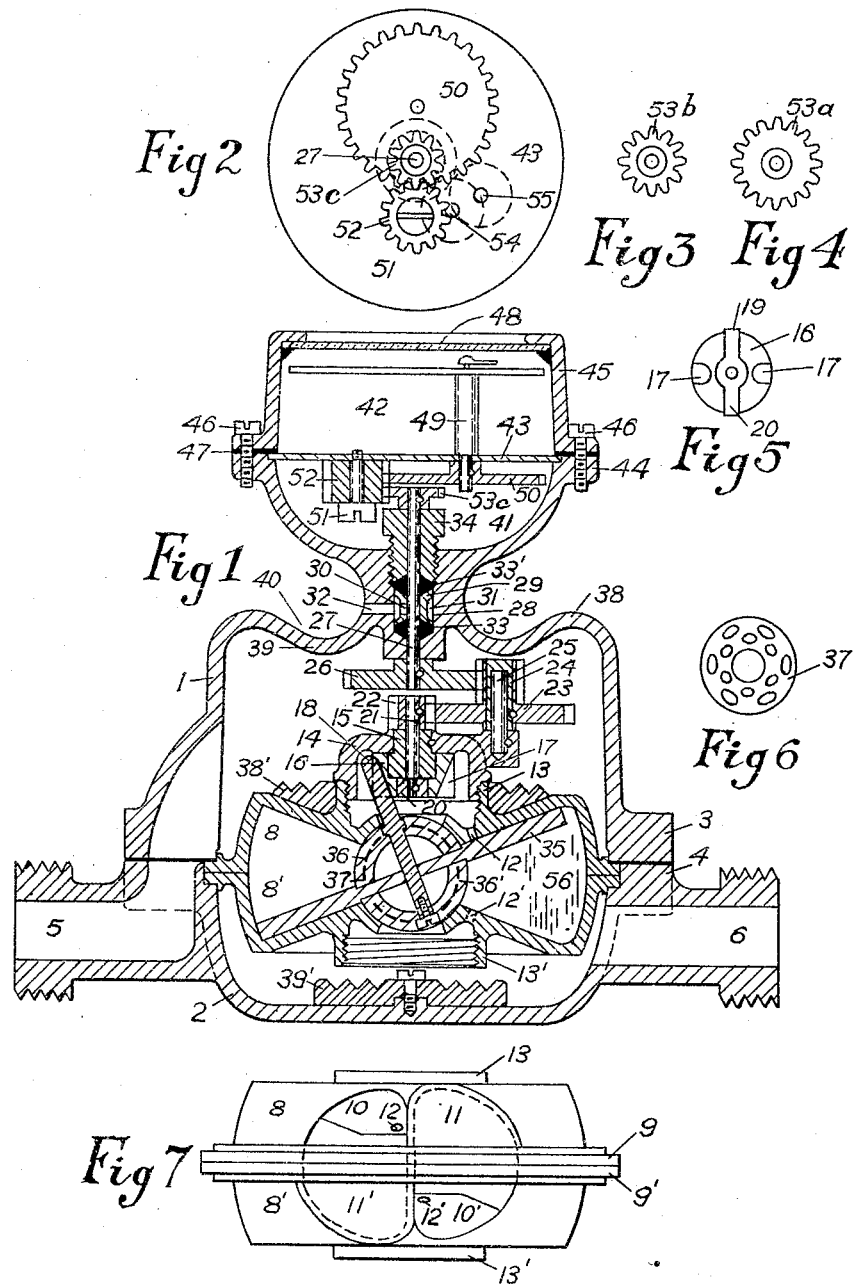

GEORGE B. BASSETT, OF BUFFALO, NEW YORK.

WATER-METER.

1,190,705.  Specification of Letters Patent.  Patented July 11, 1916.

Application filed July 12, 1915. Serial No. 39,444.

*To all whom it may concern:*

Be it known that I, GEORGE B. BASSETT, a citizen of the United States, residing at Buffalo, in the county of Erie and State of New York, have invented a new and useful Water-Meter, of which the following is a specification, reference being had to the drawings accompanying and forming a part thereof.

The objects of my present invention are principally to improve the construction and arrangement of the outside casing, measuring chamber, intermediate gearing, indicator gearing, stuffing box, measuring disk and disk control, and other parts in the construction of water meters for the purpose of reducing the cost of manufacture, allowing the more ready assemblage, separation, and adjustment of parts, increasing the efficiency and durability, and giving other advantageous results.

I will now proceed to definitely describe the manner in which I have carried out my invention and then claim what I believe to be novel.

In the drawings, Figure 1 is a central vertical longitudinal section of my improved meter showing the interior working parts in place. Fig. 2 is a horizontal upward view of the bottom of the indicator showing the arrangement of the change gears. Fig. 3 is a horizontal view of the U. S. gallon meter change gear and Fig. 4 is a horizontal view of the cubic foot meter change gear. Fig. 5 is a horizontal upward view of the combination disk control and intermediate gear driving block. Fig. 6 is a plan view of the disk ball reinforcement. Fig. 7 is a horizontal side view of the measuring chamber removed from the outside case.

The outer casing of the meter is composed of two detachable parts, 1 and 2, which may be fastened together by bolts passing through the meeting flanges 3 and 4. Lower casing 2 is provided with an inlet spud 5 and an outlet spud 6. Between the meeting flanges 3 and 4 are supported the two halves 8 and 8' of the measuring chamber which are substantially alike and provided with circular supporting flanges 9 and 9', open ports 10 and 10', covered ports 11 and 11', drainage holes 12 and 12', and central hubs 13 and 13' for supporting intermediate gear and disk control plate 14 which is made solid and tight to prevent sand or sediment settling on top of the disk ball and working into and cutting the central ball disk bearing.

56 is a partition plate located between and separating the ports of the measuring chamber. The measuring chamber as thus formed is reversible and the accurate life of the meter especially at small flows may be doubled by reversing it. The hard rubber nutating disk ball and its sockets formed in the end cones of the disk chamber gradually wear in service on the sides toward the outlet port of the measuring chamber so as to let the edge of the disk drag on the spherical side wall of the disk chamber, thus reducing the sensitiveness of the meter especially at small flows. When this occurs in my improved meter the disk spindle 18 is reversed so as to stick out of the other side of the disk and the measuring chamber and disk turned over so part 8 which is now the top half of the measuring chamber will be the bottom and part 8' which is now the bottom half of the measuring chamber will be the top, gear plate 14 being changed from center hub 13 to center hub 13'. The wear will then come on the other and unworn sides of the disk ball and its sockets.

In gear plate 14 is rigidly mounted combined bearing hub and bushing 15 on the lower end of which is rotatably mounted combined disk control and intermediate gear hard rubber driving block 16 which is provided with two grooves 17 at the sides, either one of which is adapted to receive and control nutating disk spindle 18. Block 16 is also provided with a groove 19 across the bottom which is adapted to receive loosely and drive the double driving arm 20 which is rigidly mounted on rotatably driving spindle 21 of the intermediate gear train.

On spindle 21 is rigidly mounted intermediate driving pinion 22 whose teeth mesh with and drive intermediate gear and pinion 23 in which is mounted hard rubber bushing 24 which is closed at its upper end. Intermediate gear and pinion 23 and its inclosed bushing 24 are rotatably mounted on intermediate gear pin 25 which is rigidly mounted in intermediate gear plate 14.

Intermediate gear and pinion 23 mesh with and drive stuffing box gear 26 which is rigidly mounted on the lower end of and rotates stuffing box shaft 27. Stuffing box shaft 27 passes through weeping stuffing box 28 which is provided with a gland 29 having a hole 30 extending from stuffing box shaft 27 to circular recess 31 which communicates with weeping hole 32 extending from stuffing box 28 through its exterior wall.

33 and 33′ are elastic packings located in stuffing box 28 and held in and compressed by threaded stuffing box cover 34. Any water that may leak by elastic packing 33 will run out of the hole 32 and not go into the indicator box.

Nutating measuring disk 35 is provided with a hollow central hard rubber bearing ball made in two parts 36 and 36′. Each half ball 36 and 36′ contains a metal reinforcing plate 37 which strengthens it and keeps it from changing shape from the pressure or the temperature of the water, by this construction the half balls being of about even thickness throughout are more evenly vulcanized in manufacture than when they are made solid as heretofore and are thus more durable and are also less liable to expand and contract unduly due to minor changes in the temperature of the water.

38′ and 39′ are plates of zinc or other substance negative electrically to the copper alloy of which the measuring chamber, gearing or outer case of the meter is made. Some waters corrode the copper alloy parts of the meter and I find I can largely do away with this corrosion by placing these negative plates in the compartments of the meter between the measuring chamber and the outside case as they are gradually eaten away instead of the gearing or other copper alloy parts of the meter. Gear plate 14 is also made of zinc or other substance negative electrically to the intermediate gearing which is of copper alloy for the same purpose.

Top outside case 1 is formed with a corrugated top; the corrugations 38 and 39 being exterior to the indicator box. Should the meter freeze the corrugations permit the indicator box to rise without distortion and it may then be pressed back to its original position without harm to itself or to the outside case.

The trough 40 formed by corrugation 39 will catch and hold any water temporarily leaking from the stuffing box through weeping hole 32 and prevent it running on the floor. When meters are first set the stuffing box often leaks slightly temporarily until the packing 33 is wetted, when the leaking stops.

41 is a hermetically sealed indicator compartment formed in the top of the meter.

42 is an indicator of any approved form which is supported in compartment 41 by its bottom plate 43 being clamped between flange 44 and indicator cap 45 by means of screws 46. The joint between flange 44 and indicator cap 45 is rendered tight by means of flange packing 47.

48 is the indicator glass which is tightly cemented into the top of indicator cap 45.

49 is the driven shaft of the indicator on which is rigidly mounted indicator percentage change gear 50.

51 is a rigid bearing stud screw fastened to the bottom of indicator 42 on which is rotatably mounted idler pinion 52.

53$^c$ is the denominational meter change gear which is rigidly mounted on the upper end of stuffing box shaft 27.

In operating, the water enters at inlet spud 5 and passes upward into outer case 1 and over the top of intermediate gear plate 14 to and through open port 10 and covered port 11′ into the measuring-chamber, operating the measuring disk 35 and passing out through open port 10′ and covered port 11 to and through outlet spud 6. The measuring disk 35, as it nutates, rotates driving block 16 which operates the intermediate gearing and stuffing box shaft 27 and its denominational meter change gear 53$^c$, which meshes with and operates idler gear 52, which meshes with and operates percentage indicator change gear 50 and its driven indicator shaft 49.

The usual practice in meter construction is for meter change gear 53$^c$ to mesh directly with indicator change gear 50. As the centers of these gears are fixed quite closely together, being only about 5/8 of an inch apart the number of teeth of suitable size that may be used on them is relatively small. This necessitates a great number of different sizes of change gears, some meters requiring a stock of several hundred change gears in order to properly adjust each meter when tested to accurately indicate the amount of water that passes through it in the denominations of cubic feet, U. S. gallons, imperial gallons, or other denominations.

To properly illustrate the advantages of my improved system of change gears I will be concrete. By making indicator percentage change gear 50 large and passing it over the top of meter change gear 53$^c$, I can, on the same diameter blanks, cut respectively 51, 52, 53, 54 and 55 teeth without the teeth varying in size so much that they will not mesh with idler pinion 52. Idler pinion 52 may have any convenient number of teeth and may be held in different locations on plate 43, for instance, by moving it and its screw bearing stud 51 to threaded holes 54 or 55.

Meter manufacturers in the United States, have calls mostly for water meters indicating in cubic feet, U. S. gallons, and also imperial gallons for export to Canada. It is usual to test and adjust water meters by weighing the water passed through them while on the testing bench, on the basis that 10 cubic feet of water weighs 625 pounds, 100 U. S. gallons—833⅓ pounds, and 100 imperial gallons—1000 pounds. By inverting the ratio of these weights I get the proportions of 8, 6, and 5 respectively as the correct ratios of the number of teeth on the denominational meter change gears in order to have a meter indicate correctly the amount of water passing through it in cubic feet, U. S. gallons or imperial gallons without retesting the meter or changing the denominational indicator change gear 50 after the meter is once tested and correctly adjusted.

In practice I use, for indicating cubic feet, denominational meter change gear 53ª with 16 teeth with idler gear 52 located at 55; for indicating U. S. gallons, denominational meter change gear 53ᵇ with 12 teeth with idler gear 52 located at 54; for indicating imperial gallons, denominational meter change gear 53ᶜ with 10 teeth and with it idler gear 52 located as shown in the drawings. This system of change gears may be applied to other meters than water meters and is the inverse of the system of change gears on which Letters Patent #1073386 was granted to me September 16, 1913.

Having thus described my invention, what I claim and desire to secure by Letters Patent is—

1. A water meter comprising a registering indicator, a water operated device, a stuffing box intermediate said indicator and said water operated device, a stuffing box shaft passing through said stuffing box and means whereby said stuffing box shaft may be actuated at its inner end by the power furnished by said water operated device, an indicator percentage change gear, an idler gear meshing with said indicator percentage change gear and a series of denominational meter change gears whose teeth have the ratios of 8 for indicating cubic feet, 6 for indicating U. S. gallons and 5 for indicating imperial gallons, any one of which is adapted to transmit motion from said stuffing box shaft through said idler gear to said indicator percentage change gear; substantially as and for the purpose described.

2. A water meter comprising a registering indicator, a water operated device, a stuffing box shaft adapted to transmit motion from said water operated device to said indicator, and intermediate to said indicator and said water operated device a weeping stuffing box through which said shaft passes comprising a cylindrical recess in the meter case having a weep hole in its cylindrical wall, two packings one on each side of said weep hole, a gland intermediate to said packings and also having a weep hole communicating with the weep hole in the wall of the cylindrical recess; substantially as and for the purpose described.

3. A water meter comprising a registering indicator, a hermetically sealed indicator compartment in which said indicator is located, a water operated device, a stuffing box shaft adapted to transmit motion from said water operated device to said indicator, and intermediate to said indicator compartment and said water operated device a weeping stuffing box through which said shaft passes comprising a cylindrical recess in the meter case having a weep hole in its cylindrical wall, two packings one on each side of said weep hole, a gland intermediate to said packings and also having a weep hole communicating with the weep hole in the wall of the cylindrical recess; substantially as and for the purpose described.

4. A water meter comprising an indicator box containing the indicator and a casing containing the submerged parts of the meter and having corrugations formed therein adjacent and exterior to said indicator box whereby abnormal expansion of the casing will not distort the indicator box; substantially as and for the purpose described.

5. A meter stuffing box comprising a cylindrical recess in the meter case having a weep hole in its cylindrical wall, two packings one on each side of said weep hole, a gland intermediate to said packings and also having a weep hole communicating with the weep hole in the wall of the cylindrical recess; substantially as and for the purpose described.

6. A water meter comprising an indicator, an indicator box containing said indicator, a water operated device, a weeping stuffing box intermediate to said indicator and said water operated device, a stuffing box shaft passing through said stuffing box and transmitting motion from said water operated device to said indicator, and a casing containing said water operated device and having a trough formed therein adjacent to said weeping stuffing box and exterior to said indicator box; substantially as and for the purpose described.

7. A water meter comprising a registering indicator, a water operated device, a gear intermediate to said indicator and said water operated device and adapted to transmit motion from said water operated device to said indicator, a bushing with a closed upper end rigidly mounted in said gear, and a bearing pin on which said gear and bushing is rotatably supported; substantially as and for the purpose described.

8. A water meter comprising a registering indicator, a water operated device, a gear intermediate to said indicator and said water operated device and adapted to transmit motion from said water operated device to said indicator, a hard rubber bushing with a closed upper end rigidly mounted in said gear, and a bearing pin on which said gear and bushing is rotatably supported; substantially as and for the purpose described.

9. A water meter comprising a registering indicator, a nutating measuring disk and its disk spindle, a driving spindle and its double driving arm intermediate to said indicator and said disk and adapted to transmit motion from said disk to said indicator, and a disk controlling block with a groove at the side to receive said disk spindle and also with a groove across the bottom to loosely receive said double driving arm; substantially as and for the purpose described.

10. A water meter comprising a registering indicator, a nutating measuring disk and its disk spindle, a driving spindle and its double driving arm intermediate to said indicator and said disk and adapted to transmit motion from said disk to said indicator, and a hard rubber disk controlling block with a groove at the side to receive said disk spindle and also with a groove across the bottom to loosely receive said double driving arm; substantially as and for the purpose described.

11. A water meter comprising a submerged part of a substance electrically negative to the other parts of the meter and means of removably mounting same in said meter; and not constituting one of the working parts of the meter substantially as and for the purpose described.

12. A water meter comprising a replaceable submerged intermediate gear plate made of a substance electrically negative to the other parts of the meter; substantially as and for the purpose described.

13. A disk water meter comprising a reversible measuring chamber composed of halves which are alike and interchangeable; substantially as and for the purpose described.

14. A disk water meter comprising an outer surrounding case, a reversible measuring chamber composed of halves which are alike and interchangeable, and supporting flanges formed on the meeting edges of said halves of said measuring chamber whereby they are supported in said outer case; substantially as and for the purpose described.

15. A water meter comprising an intermediate gear plate, a reversible measuring chamber for the nutating disk and composed of halves which are alike and interchangeable and each having means for attaching said gear plate thereto; substantially as and for the purpose described.

16. A water meter comprising a nutating measuring disk, a measuring chamber containing said disk, a disk control, a disk control bearing hub and a separable solid support for said disk control bearing hub mounted on said measuring chamber so as to form with it a tightly covered disk control compartment over which the water flows in its passage through the meter; substantially as and for the purpose described.

17. A water meter comprising a nutating measuring disk, a measuring chamber containing said disk, a disk control, a disk control bearing hub, a separate solid support for said disk control bearing hub mounted on said measuring chamber so as to form with it a tightly covered disk control compartment over which the water flows in its passage through the meter, and an end cone of said measuring chamber formed with a drainage hole extending from said compartment to the interior of said measuring chamber; substantially as and for the purpose described.

18. A water meter comprising a nutating measuring disk, a measuring chamber containing said disk, intermediate gearing operated by said disk, an intermediate gear bushing, and a separable solid support for said gear bushing and gearing mounted on said measuring chamber so as to form with it a tightly covered disk control compartment over which the water flows in its passage through the meter; substantially as and for the purpose described.

19. A water meter comprising a nutating measuring disk, a measuring chamber containing said disk, intermediate gearing operated by said disk, an intermediate gear bushing, a separable solid support for said gear bushing and gearing mounted on said measuring chamber so as to form with it a tightly covered disk control compartment over which the water flows in its passage through the meter, and an end cone of said measuring chamber formed with a drainage hole extending from said compartment to the interior of said measuring chamber; substantially as and for the purpose described.

20. A water meter comprising a nutating measuring disk made of hard rubber and a cup formed reinforcing plate embedded in the central bearing ball thereof; substantially as and for the purpose described.

21. A water meter comprising a nutating measuring disk, having a hard rubber central bearing ball, and a perforated cup formed reinforcing plate embedded in said ball; substantially as and for the purpose described.

22. A water meter comprising a nutating measuring disk, having a hollow hard rubber central bearing ball, and a cup formed reinforcing plate embedded in said ball; substantially as and for the purpose described.

23. A water meter comprising a nutating measuring disk, having a hard rubber central bearing ball made of separate parts mounted on each side of said disk, and cup formed metal reinforcements embedded in said parts of the ball; substantially as and for the purpose described.

24. A water meter comprising a replaceable submerged intermediate gear plate made of a substance electrically negative to the other parts of the meter, a bushing mounted in said gear plate, and an intermediate gear spindle mounted in said bushing; substantially as and for the purpose described.

In witness whereof I have hereunto set my signature.

GEORGE B. BASSETT.

Witnesses:
   CHAS. K. BASSETT,
   GEORGE R. BARREL.

Copies of this patent may be obtained for five cents each, by addressing the "Commissioner of Patents, Washington, D. C."